United States Patent
Kim et al.

(10) Patent No.: US 10,924,677 B2
(45) Date of Patent: Feb. 16, 2021

(54) ELECTRONIC DEVICE AND METHOD FOR PROVIDING NOTIFICATION RELATED TO IMAGE DISPLAYED THROUGH DISPLAY AND IMAGE STORED IN MEMORY BASED ON IMAGE ANALYSIS

(71) Applicant: Samsung Electronics Co., Ltd., Suwon-si (KR)

(72) Inventors: Keeseok Kim, Suwon-si (KR); Yunson Yoo, Suwon-si (KR); Kwangkyu Park, Suwon-si (KR); Yongho You, Suwon-si (KR); Chanhee Yoon, Suwon-si (KR); Jinwon Jang, Suwon-si (KR); Kyoungsu Cho, Suwon-si (KR); Wooyong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/536,198

(22) Filed: Aug. 8, 2019

(65) Prior Publication Data

US 2020/0053288 A1   Feb. 13, 2020

(30) Foreign Application Priority Data

Aug. 8, 2018  (KR) .................. 10-2018-0092230

(51) Int. Cl.
H04N 5/232   (2006.01)

(52) U.S. Cl.
CPC ..... *H04N 5/23293* (2013.01); *H04N 5/23203* (2013.01); *H04N 5/23222* (2013.01)

(58) Field of Classification Search
CPC .................................................. H04N 5/23293
(Continued)

(56) References Cited

U.S. PATENT DOCUMENTS

| 9,332,175 B2 | 5/2016 | Jeong et al. |
| 9,413,965 B2 | 8/2016 | Ryu et al. |

(Continued)

FOREIGN PATENT DOCUMENTS

| JP | 2014-052426 A | 3/2014 |
| KR | 10-2015-0014226 A | 2/2015 |

(Continued)

OTHER PUBLICATIONS

International Search Report dated Nov. 26, 2019 in connection with International Patent Application No. PCT/KR2019/009833, 3 pages.

(Continued)

*Primary Examiner* — Joel W Fosselman

(57) ABSTRACT

An electronic device including is disclosed. The electronic device includes at least one camera, at least one memory, a display, and at least one processor. The at least one processor is configured to acquire an image through the at least one camera. The at least one processor is also configured to acquire a plurality of parameters related to acquiring the image. The at least one processor is additionally configured to identify a feedback of a plurality of feedbacks to be provided to a user according to priorities associated with the plurality of feedbacks that are provided to the user, based on a portion of the plurality of acquired parameters. The at least one processor is further configured to display a guidance corresponding to the identified feedback through the display.

11 Claims, 15 Drawing Sheets

(58) Field of Classification Search
USPC .................................................... 348/222.1
See application file for complete search history.

(56) References Cited

U.S. PATENT DOCUMENTS

| | | | |
|---|---|---|---|
| 9,538,059 | B2 | 1/2017 | Lim |
| 2014/0247325 | A1 | 9/2014 | Wu et al. |
| 2014/0293079 | A1 | 10/2014 | Milanfar et al. |
| 2015/0029381 | A1 | 1/2015 | Kang et al. |
| 2016/0006945 | A1 | 1/2016 | Furuhashi |
| 2016/0357406 | A1* | 12/2016 | Lee .................... H04N 5/23293 |

FOREIGN PATENT DOCUMENTS

| | | |
|---|---|---|
| KR | 10-2015-0020917 A | 2/2015 |
| KR | 10-1641513 B1 | 7/2016 |
| KR | 10-1810447 B1 | 12/2017 |
| WO | 2018/092016 A1 | 5/2018 |

OTHER PUBLICATIONS

Written Opinion of the International Searching Authority dated Nov. 26, 2019 in connection with International Patent Application No. PCT/KR2019/009833, 7 pages.

* cited by examiner

ELECTRONIC DEVICE AND METHOD FOR PROVIDING NOTIFICATION RELATED TO IMAGE DISPLAYED THROUGH DISPLAY AND IMAGE STORED IN MEMORY BASED ON IMAGE ANALYSIS

CROSS-REFERENCE TO RELATED APPLICATIONS

This application is based on and claims priority under 35 U.S.C. 119 to Korean Patent Application No. 10-2018-0092230, filed on Aug. 8, 2018, in the Korean Intellectual Property Office, the disclosure of which is herein incorporated by reference in its entirety.

BACKGROUND

1. Field

The disclosure relates to a method and an apparatus for providing feedback related to capturing an image on the basis of image analysis.

2. Description of Related Art

Recently, a camera technology in various electronic devices, such as mobile communication terminals, smart phones, tablet Personal Computers (PCs), or wearable devices, is being developed. A camera in various electronic devices may capture a still image or a moving image. Further, the camera may provide various shooting modes having a variety of effects, such as a burst mode (or a continuous shooting mode) or a panorama mode. Various embodiments are related to a technology for capturing images.

The above information is presented as background information only to assist with an understanding of the disclosure. No determination has been made, and no assertion is made, as to whether any of the above might be applicable as prior art with regard to the disclosure.

SUMMARY

An electronic device may provide various shooting modes having various effects through a camera application. In order to use various shooting modes, a user should recognize in advance the existence or functions of the shooting modes. Accordingly, when the user does not recognize in advance the existence or functions of the shooting modes, the user may not use various functions related to image capturing and may not solve a problem about a captured image having low quality.

Various embodiments may provide an electronic device and a method for guiding a shooting method suitable for a condition by providing an optimal feedback to the user according to the condition under which an image is captured.

The technical subjects pursued in the disclosure may not be limited to the above mentioned technical subjects, and other technical subjects which are not mentioned may be clearly understood, through the following descriptions, by those skilled in the art of the disclosure.

In accordance with an aspect of the disclosure, an electronic device is provided. The electronic device includes: at least one camera; at least one memory configured to store instructions; a display; and at least one processor, wherein the at least one processor is configured to, when the instructions are executed, acquire an image through the at least one camera, acquire a plurality of parameters related to acquisition of the image, identify a feedback to be provided to a user according to priorities of a plurality of feedbacks among the plurality of feedbacks, which can be provided to the user, based on at least some of the plurality of acquired parameters, and display a guidance corresponding to the identified feedback through the display.

In accordance with another aspect of the disclosure, an electronic device is provided. The electronic device includes: a camera; a display; a memory; and a processor, wherein the processor is configured to display a plurality of first images of an external object acquired through the camera configured as a first shooting mode through the display, determine whether at least some of the plurality of first images analyzed through a predetermined image analysis scheme satisfy a predetermined condition while the plurality of first images are displayed, display a notification related to a second shooting mode corresponding to the predetermined condition based at least on determination that the at least some images satisfy the predetermined condition, configure the camera as the second shooting mode based at least one an input related to the notification, and display a plurality of second images of the external object acquired using the camera configured as the second shooting mode through the display.

In accordance with another aspect of the disclosure, an electronic device is provided. The electronic device includes: a camera; a display; a memory; and a processor, wherein the processor is configured to acquire a plurality of images of an external object through the camera, display at least some of the plurality of images through the display for at least a portion of a time during which the plurality of images are acquired, display a first notification related to a first predetermined condition through the display when the at least some images analyzed through a first predetermined image analysis scheme correspond to the first predetermined condition while the at least some images are displayed, store one or more images acquired according to an input related to capturing of a user among the plurality of images in the memory while the at least some images are displayed, and display a second notification corresponding to a second predetermined condition through the display when the one or more images analyzed using a second predetermined image analysis scheme correspond to the second predetermined condition.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
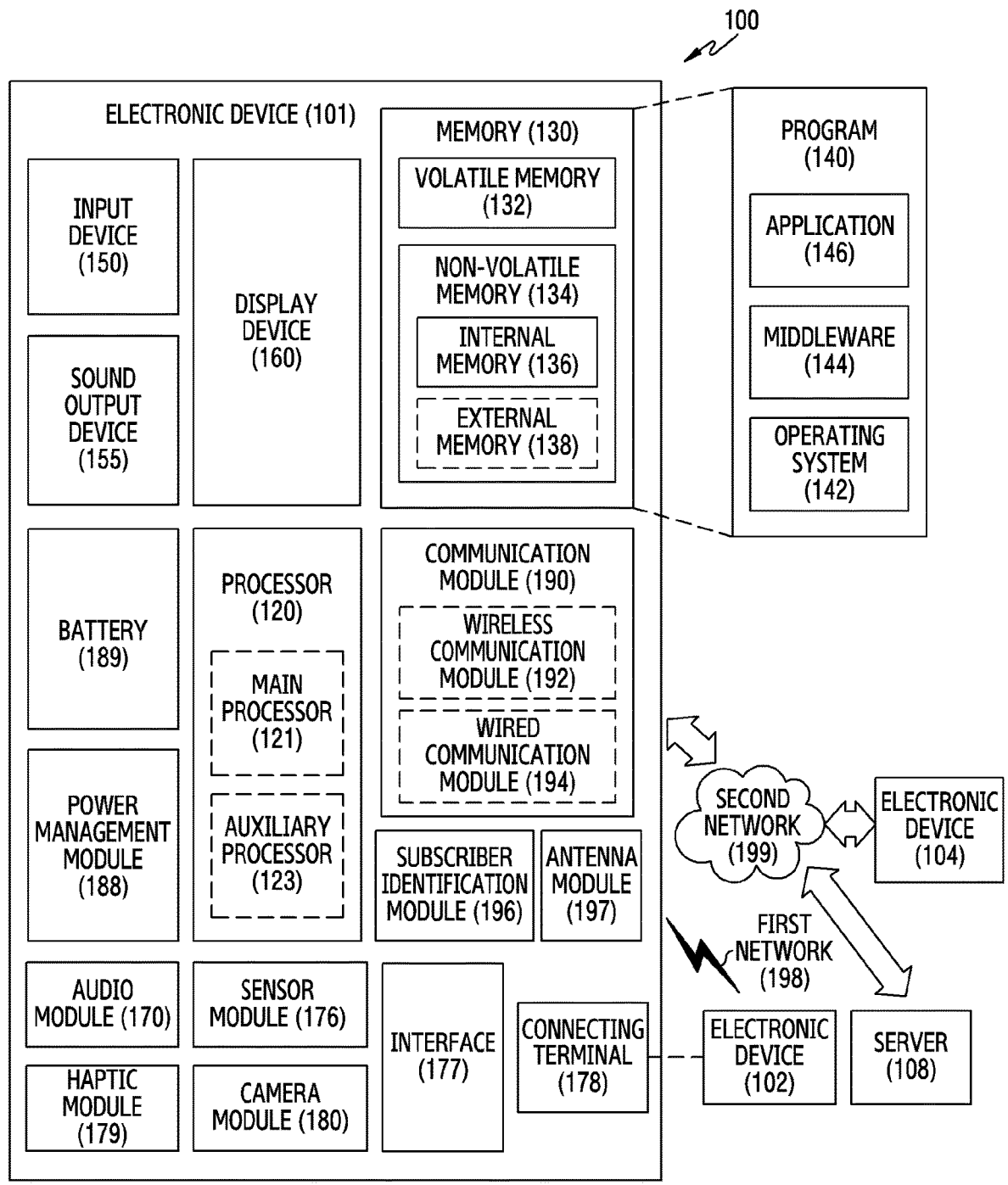
FIG. 1 illustrates a block diagram of an electronic device within a network environment according to various embodiments.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
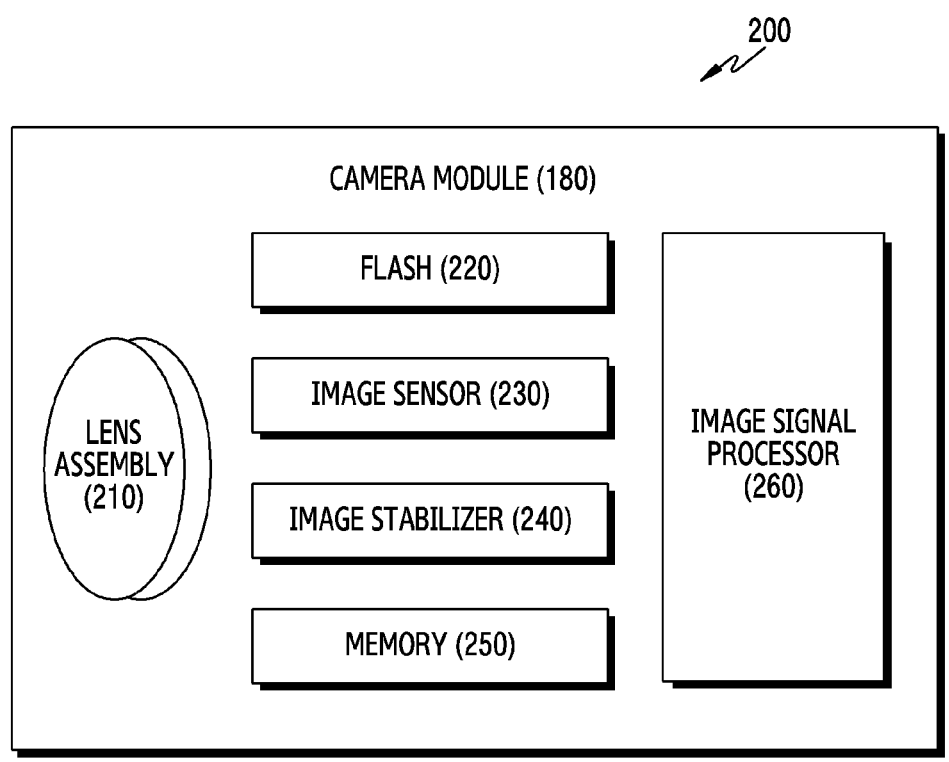
FIG. 2 illustrates a block diagram of a camera module according to various embodiments.

FIG. 2 illustrates a block diagram 200 of the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
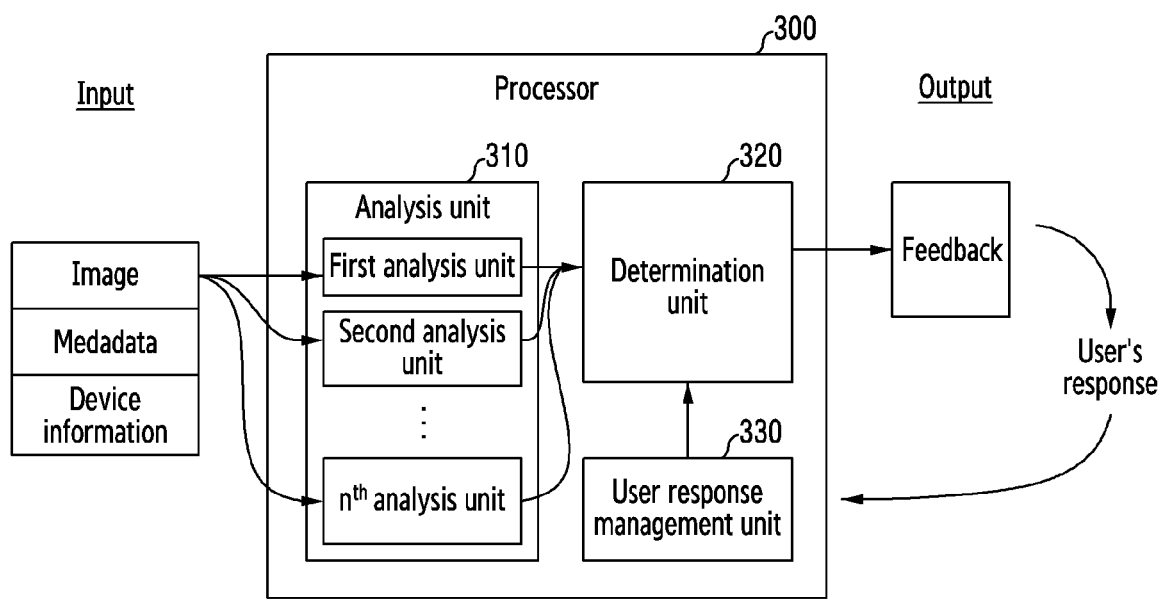
FIG. 3 illustrates an example of modules used by a processor of the electronic device according to various embodiments.
Figure 4:
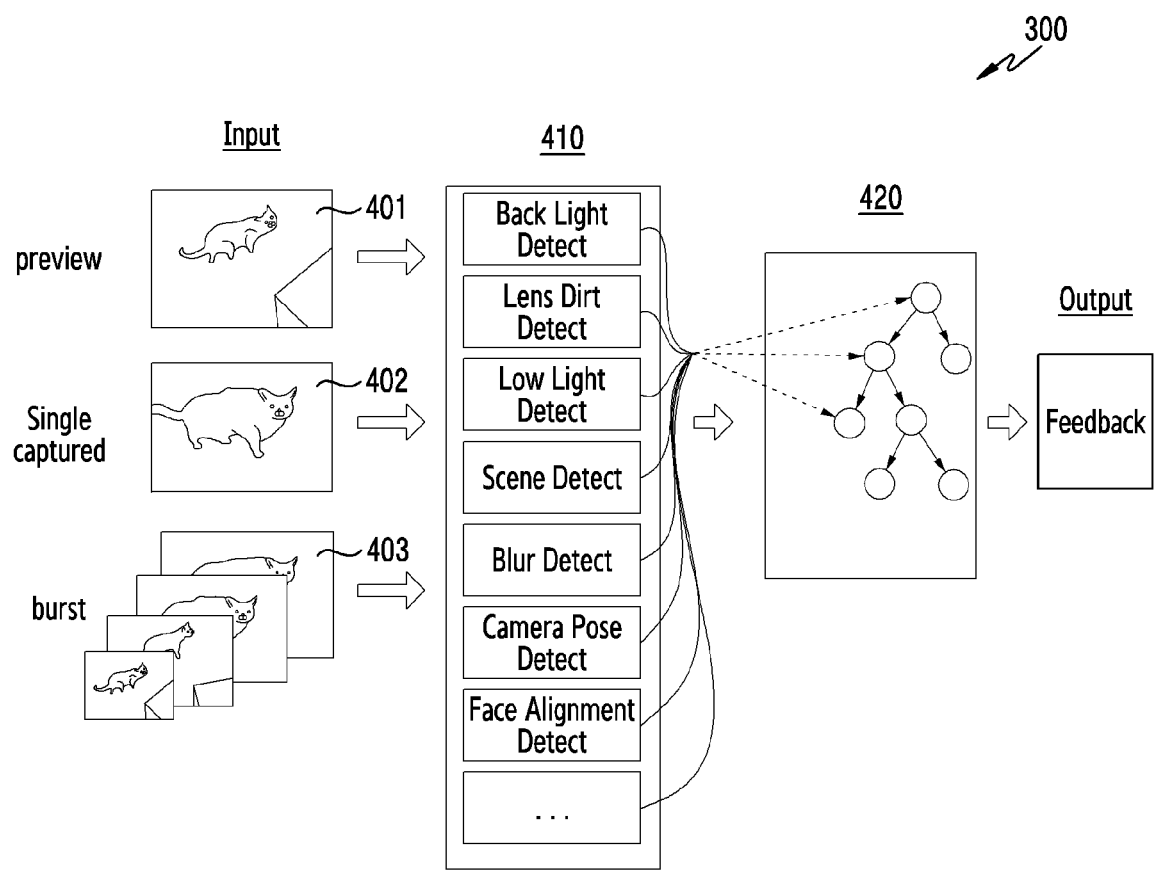
FIG. 4 illustrates an example of the operation of the processor according to various embodiments.

FIG. 3 illustrates an example of modules used by a processor 300 of the electronic device 101 according to various embodiments. The processor 300 may include at least one of the processor 120 or the image signal processor 260. FIG. 4 illustrates an example of the operation of the processor 300 according to various embodiments.

Referring to FIG. 3, modules used by the processor 300 may include an analysis unit 310, a determination unit 320, and a user response management unit 330. Step 410 of FIG. 4 may correspond to the operation of the analysis unit 310, and step 420 may correspond to the operation of the determination unit 320.

According to various embodiments, the processor 300 may acquire at least one of an image, metadata of the image, or device information of the electronic device 101 as an input. Referring to FIG. 4, the processor 300 may acquire the input while a preview image 401 is displayed. The processor 300 may acquire the input in response to capturing of the image. For example, the processor 300 may acquire the input in response to capturing of a single image 402, capturing of a burst image 403, or capturing of a moving image (not shown).

The input image may include an image acquired through the image sensor 230 or an image stored (or temporarily stored) in the memory 250. For example, the image may be at least one of a plurality of images acquired as a preview image 401, a captured single image 402, and a captured burst image 403, or a captured moving image.

The metadata may include attribute information of the image. For example, the metadata may include at least one of a manufacturer, a model, orientation or rotation, a date and time, an exposure time, flash, a focal length, a color space, ISO, aperture, a shutter speed, or Global Positioning System (GPS) information. The device information may include, for example, information on sensor data of the electronic device 101.

The device information may include, for example, a value of a gyro sensor or a value of a luminance sensor of the electronic device 101 at a time point at which the image is captured. The gyro sensor value or the luminance sensor value may be used to determine whether the electronic device 101 is shaken at the time point at which the image is captured or whether an area around the electronic device 101 is in a low luminance environment at the time point at which the image is captured.

The processor 300 may acquire (detect, analyze, or identify) a plurality of parameters on the basis of the input image, the metadata, and/or the device information through the analysis unit 310. For example, referring to step 410 of FIG. 4, the plurality of parameters may include a parameter for a degree of backlight of the image, a parameter for identifying whether a lens is dirty, a parameter for luminance of the image, a parameter for identifying a scene of the image, a parameter for a degree of blur of the image, a parameter for a horizontal level of the electronic device 101, a parameter for a degree of shaking of the electronic device 101, a parameter for a degree of blur of a face included in the image, and a parameter for a degree of closed eyes of a person included in the image. However, the disclosure is not limited thereto.

The analysis unit 310 may include a first analysis unit, a second analysis unit, and an $n^{th}$ analysis unit in order to acquire the plurality of parameters. The processor 300 may acquire the plurality of parameters from the input image, the metadata, and/or the device information through the first analysis unit to the $n^{th}$ analysis unit. For example, the processor 300 may acquire the parameter for the degree of backlight of the image through the first analysis unit. The processor 300 may acquire the parameter for identifying whether the lens is dirty through the second analysis unit. The processor 300 may acquire the parameter for the scene of the image through the nib analysis unit. For example, the nib analysis unit may perform scene analysis on the image and identify the scene of the image. The $n^{th}$ analysis unit may identify the scene of the image as one of the scenes including food, landscape, face, or document. However, the disclosure is not limited thereto.

The processor 300 may identify (or determine) a feedback to be provided to the user among a plurality of feedbacks which can be provided to the user using the plurality of acquired parameters through the determination unit 320. The plurality of feedbacks which can be provided to the user may be feedbacks related to image capturing. The plurality of feedbacks may include, for example, a feedback inducing recapturing or a feedback recommending a specific function of capturing. The plurality of feedbacks may have priorities. The determination unit 320 may determine a feedback to be provided to the user among the plurality of feedbacks which can be provided to the user according to the priorities of the plurality of feedbacks.

TABLE 1

| Type | Feedback |
| --- | --- |
| First type | Device shake, Dirty lens, Backlight, Blurred face, Closed eyes, Tilt |
| Second type | Live focus recommend, Bixby vision recommend, Panorama recommend, Food recommend, Wide selfie recommend, Today's selfie recommend, Animated GIF recommend, Video Summary recommend, Mode Shortcut recommend |

[Table 1] may show an example of the plurality of feedbacks which can be provided to the user. For example, the plurality of feedbacks which can be provided to the user may include a first type and a second type. The first type may indicate the feedback inducing recapturing. The second type may indicate the feedback recommending a specific function of capturing. The second type may indicate a feedback recommending a shooting mode.

For example, the electronic device 101 may provide the first type feedback in preference to the second type feedback. That is, the first type feedback may have a higher priority than the second type feedback. Further, a plurality of feedbacks included in the first type may have priorities, and a plurality of feedbacks included in the second type may have priorities.

Hereinafter, an operation of the processor 300 related to providing of the first type feedback is described as an example of the operation of the processor 300 according to various embodiments.

In order to determine feedbacks to be provided to the user, the processor 300 may determine items indicating whether the image includes backlight, whether the lens is dirty, whether the electronic device 101 is shaken, whether a face included in the image is shaken, whether eyes of a person included in the image are closed, or whether the image is leveled through a plurality of parameters. According to the result of determination for the items, the electronic device 101 may provide the user with the feedback inducing recapturing of the image. For example, the electronic device 101 may output a guidance of "The picture is shaken. Capture again while holding the camera tight" in response to determination of the shaken picture.

In order to determine each of the items, the processor 300 may use one or more parameters among the plurality of parameters (acquired by the analysis unit 310). For example, the plurality of parameters may have weights to determine the items.

According to an embodiment, the processor 300 may use the plurality of parameters (with the weights) acquired by the analysis unit 310 in order to determine whether the face included in the image is shaken. For example, the processor 300 may identify that the electronic device 101 is not shaken on the basis of the plurality of parameters, identify that the image is a scene including a face, and determine that the face included in the image is shaken on the basis of the identification of blur of the face included in the image. That is, it is determined that a target to be captured (that is, the face) moved. The processor 300 may provide a guidance corresponding to a feedback for "blurred face" in response to determination of the shaken face. However, the disclosure is not limited thereto.

Referring to step 420 of FIG. 4, the processor 300 may sequentially determine the items according to the priorities.

TABLE 2

| Priority | Feedback |
| --- | --- |
| 1 | Device shake |
| 2 | Dirty lens |
| 3 | Backlight |
| 4 | Blurred face |
| 5 | Closed eyes |
| 6 | Tilt |
| 7 | Live focus recommend |
| 8 | Bixby vision recommend |
| 9 | Panorama recommend |
| 10 | Food recommend |
| 11 | Wide selfie recommend |
| 12 | Today's selfie recommend |
| 13 | Animated GIF recommend |
| 14 | Video Summary recommend |
| 15 | Mode Shortcut recommend |

[Table 2] shows an example of priorities of a plurality of feedbacks which can be provided to the user. However, the disclosure is not limited thereto. For example, predetermined priorities may be stored in the beginning and then adaptively changed according to the use thereof.

The processor 300 may first determine whether a condition for the a first priority feedback is satisfied. When the condition for the first priority feedback is satisfied, the processor 300 may provide a guidance corresponding to the first priority feedback without determining whether a condition of a second priority feedback is satisfied. Only when the condition for the first priority feedback is not satisfied, the processor 300 may determine whether the condition for the second priority feedback is satisfied. As described above, by assigning the priorities, it is possible to minimize the use of memory or resources and provide an optimal feedback to the user.

For example, the first type feedback inducing recapturing may be provided in preference to the second type feedback recommending a specific function. To this end, the processor 300 may determine whether the condition for providing the second type feedback is satisfied in preference to determining whether the condition for providing the first type feedback is satisfied.

As described above, the determination unit 320 may output one feedback to be provided to the user on the basis of the priority of the plurality of feedbacks. The processor 300 may display a guidance corresponding to the feedback through a display (for example, the display device 160).

The time at which the feedback is provided or the time at which the guidance is displayed may be various. For example, the processor 300 may provide the feedback at a time point after a predetermined time from entry into a camera application. The processor 300 may provide the feedback in response to identification of maintenance of posture of the electronic device 101 during a predetermined time in a preview state. The processor 300 may provide the feedback in response to capturing of a single image. The processor 300 may provide the feedback in response to capturing of a burst image (for example, at a time point at which capturing of n or more burst images is completed). The processor 300 may provide the feedback in response to capturing of a moving image (for example, at a time point at which capturing of a moving image for n or more seconds is completed).

According to an embodiment, the time point at which the feedback is provided may vary depending on the feedback type. For example, a feedback for "dirty lens" may be provided at a time point after a predetermined time from entry into a camera application. A feedback for "backlight" may be provided when posture of the electronic device 101 is maintained for a predetermined time in a preview state or in response to capturing of a single image. A feedback for "animated GIF recommend" may be provided at a time point at which burst capturing is completed.

The operation of providing the feedback may include the operation of displaying the guidance corresponding to the feedback through the display.

The processor 300 may receive a user's response to the guidance. The user's response to the guidance may include a positive response and a negative response. The positive response may be a touch input for a button or an icon for applying a function proposed (or recommended) by the guidance. The negative response may be a user input for ignoring or removing the guidance.

The processor 300 may store and manage data on the user's response through the user response management unit 330. The processor 300 may store the feedback provided by the electronic device 101 and the user's response thereto such that they are associated with each other. The processor 300 may adaptively change priorities of the plurality of feedbacks on the basis of stored data. For example, the processor 300 may configure the priority of the feedback, to which the positive response is frequently received, to have a higher priority than the feedback, to which the negative response is frequently received. The adaptively changed priority may be used again to identify the feedback to be provided to the user by the determination unit 320.

When the negative response of any feedback is received, the processor 300 may not detect nor provide the feedback during a predetermined time.

Figure 5:
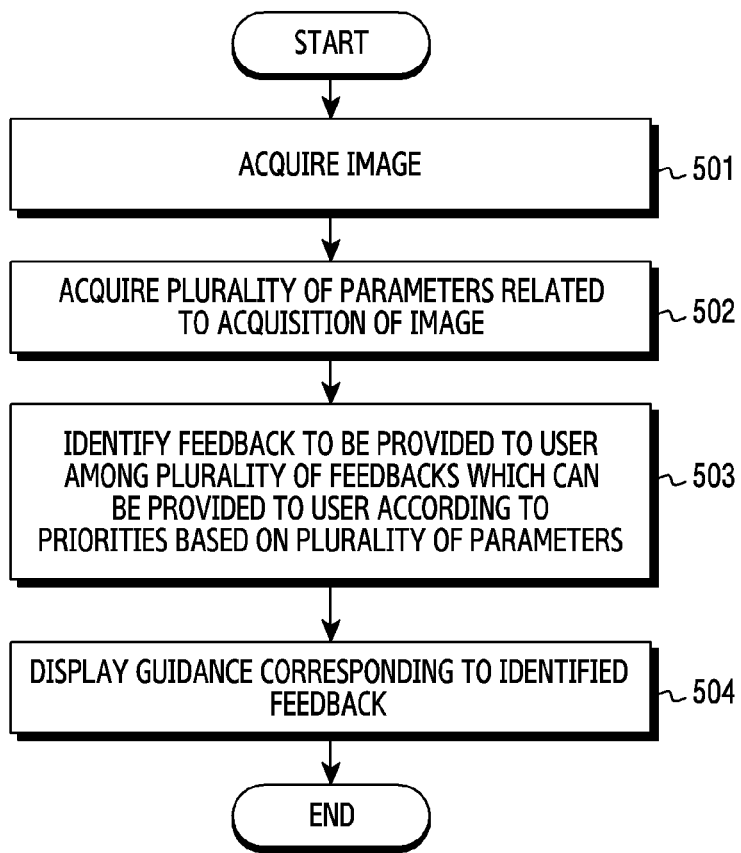
FIG. 5 illustrates an example of the operation of the electronic device according to various embodiments.

FIG. 5 illustrates an example of the operation of the electronic device 101 according to various embodiments. The operations illustrated in FIG. 5 may be performed by the processor 300 (that is, at least one of the processor 120 or the image signal processor 260).

Referring to FIG. 5, in operation 501, the processor 300 may acquire an image. For example, the processor 300 may acquire a plurality of images while a preview image is displayed through a camera application. The processor 300 may acquire a captured image in response to image capturing. For example, the processor 300 may acquire a plurality of images for a captured single image, a captured burst image, and a captured moving image. The processor 300 may acquire metadata of the image or device information of the electronic device 101 along with the image.

In operation 502, the processor 300 (for example, the analysis unit 310) may acquire a plurality of parameters related to acquisition of the image. The processor 300 may acquire a plurality of parameters for images acquired in a preview state or a captured image. For example, the plurality of parameters may include a parameter for a degree of backlight of the image, a parameter for identifying whether a lens is dirty, a parameter for luminance of the image, a parameter for identifying a scene of the image, a parameter for a degree of blur of the image, a parameter for a horizontal level of the electronic device 101, a parameter for a degree of shaking of the electronic device 101, a parameter for a degree of blur of a face included in the image, and a parameter for a degree of closed eyes of a person included in the image. However, the disclosure is not limited thereto.

In operation 503, the processor 300 (for example, the determination unit 320) may identify a feedback to be provided to the user among the plurality of feedbacks which can be provided to the user on the basis of the plurality of parameters. The processor 300 may identify the feedback to be provided to the user according to priorities of the plurality of feedbacks.

The plurality of feedbacks may include, for example, a feedback inducing recapturing or a feedback recommending a specific function of capturing. The feedback inducing recapturing may include at least one of a feedback for "device shake", a feedback for "dirty lens", a feedback for "backlight", a feedback for "blurred face", a feedback for "closed eyes", or a feedback for "tilt". The feedback recommending a function related to capturing may include a feedback recommending a shooting mode. The feedback recommending a function related to capturing may include at least one of "Live focus recommend", "Bixby vision recommend", "Panorama recommend", "Food recommend", "Wide selfie recommend", "Today's selfie recommend", "Animated GIF recommend", "Video Summary recommend", or "Mode Shortcut recommend". However, the disclosure is not limited thereto.

The plurality of feedbacks may have priorities. For example, the feedback inducing recapturing may take preference over the feedback recommending the function related to capturing. The processor 300 may preferentially identify (or determine) whether a feedback having a higher priority is required among the plurality of feedbacks. For example, when a first feedback has a higher priority than a second feedback, the processor 300 may determine whether the first feedback is required in preference to determining whether the second feedback is required. When the first feedback is required, the processor 300 may identify a feedback to be provided to the user as the first feedback. When the first feedback is not required, the processor 300 may identify whether the second feedback is required and, when the second feedback is required, identify a feedback to be provided to the user as the second feedback.

For example, in order to determine whether the first feedback is required, the processor 300 may use one or more of the plurality of parameters acquired in operation 502. For example, the processor 300 may determine whether the first feedback is required by applying weights to one or more of the plurality of parameters.

According to an embodiment, the processor 300 may determine whether the feedback for "blurred face" is required on the basis of one or more of the plurality of parameters acquired in operation 502. For example, the processor 300 may determine that the feedback for "blurred face" is required on the basis of information indicating that the electronic device 101 is shaken at a predetermined level or lower, a face is identified on the basis of the scene analysis result, and a blur face included in the image is identified.

The processor 300 (for example, the determination unit 320) may identify one feedback to be provided to the user among the plurality of feedbacks according to priorities of the plurality of feedbacks as described above.

In operation 504, the processor 300 may display a guidance corresponding to the identified feedback. The processor 300 may display the guidance within a camera application screen through the display device 160. However, the disclosure is not limited thereto. For example, the processor 300 may output the guidance corresponding to the identified feedback through a speaker.

The processor 300 may provide the guidance while a preview image is displayed and/or in response to capturing the image. For example, the processor 300 may display the guidance at a time point after a predetermined time from entry into a camera application or in response to identification of maintenance of posture of the electronic device 101 for a predetermined time in a preview state. The processor 300 may display the guidance in response to capturing of a single image, a burst image, or a moving image.

The electronic device 101 according to various embodiments may provide an optimal feedback to the user through the use of priorities even though a plurality of feedbacks related to image capturing can be provided.

Figure 6:
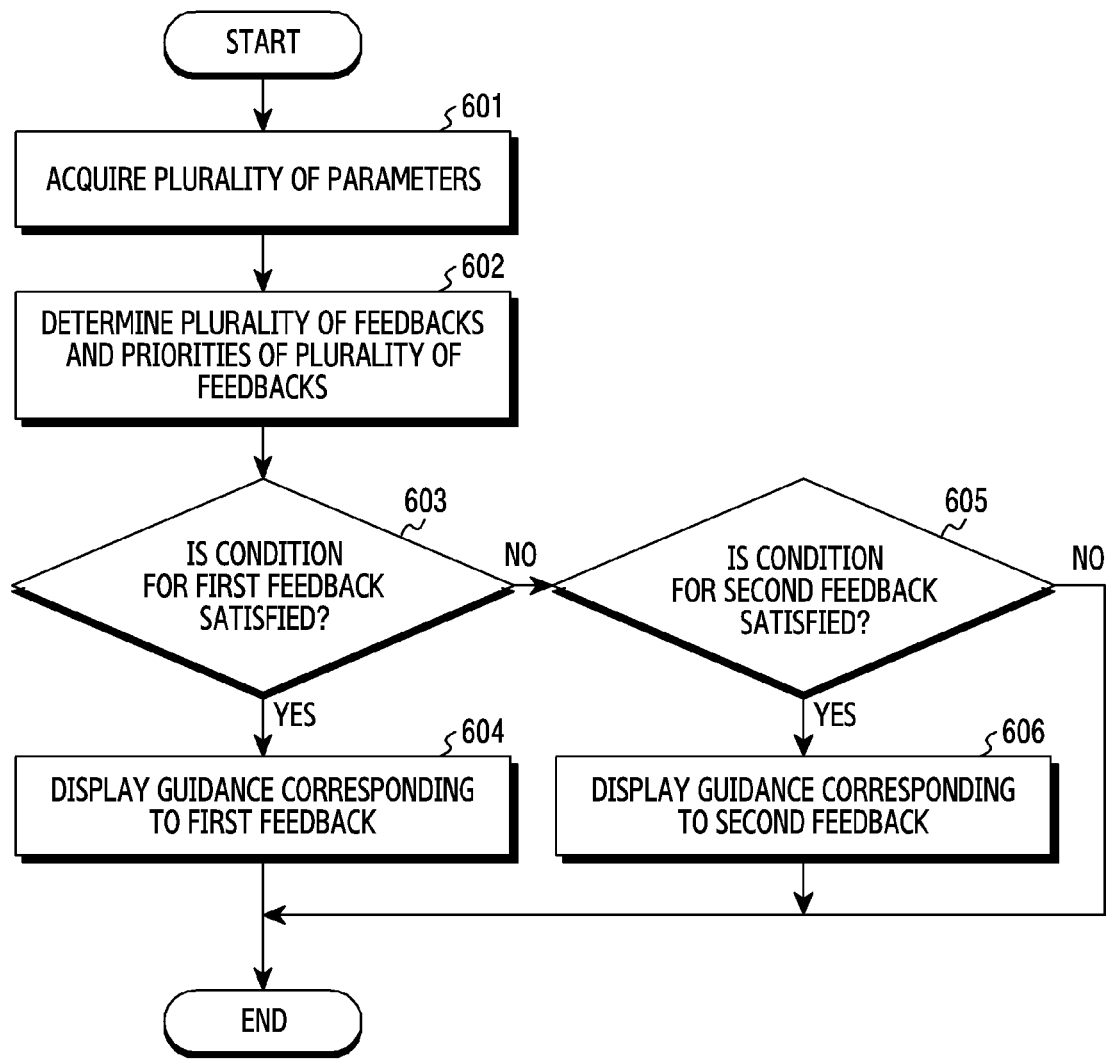
FIG. 6 illustrates an example of the operation in which the electronic device identifies a feedback to be provided to a user according to various embodiments.

FIG. 6 illustrates an example of the operation for identifying a feedback to be provided to the user by the electronic device 101 according to various embodiments. The operations illustrated in FIG. 6 may be performed by the processor 300 (that is, at least one of the processor 120 or the image signal processor 260).

Referring to FIG. 6, in operation 601, the processor 300 (for example, the analysis unit 310) may acquire a plurality of parameters related to acquisition of an image. The processor 300 may acquire a plurality of parameters for images acquired in a preview state. The processor 300 may acquire a plurality of parameters for a captured image (for example, a single image, a burst image, or a moving image). Operation 601 may correspond to operation 502 of FIG. 5.

In operation 602, the processor 300 may determine a plurality of feedbacks which can be provided to the user and/or determine priorities of the plurality of feedbacks. A plurality of feedbacks which can be provided to the user or priorities of the plurality of feedbacks may be adaptively changed according to a condition under which the image is acquired.

According to various embodiments, the plurality of feedbacks which can be provided to the user may vary depending on whether the input image is a preview image, a captured single image, a burst image, or a moving image. For example, the feedback for "device shake", "blurred face", "closed eyes", or "tilt" may not be required while the preview image is displayed. Accordingly, when the input image is the preview image, the processor 300 may exclude the feedback for "device shake", "blurred face", "closed eyes", or "tilt" from the plurality of feedbacks or change the priority thereof to a lower priority. In another example, when the input image is the moving image, the processor 300 may increase a priority of the feedback "video summary recommend". When the input image is the burst image, the processor 300 may increase a priority of the feedback "animated GIF recommend".

According to various embodiments, the priorities of the plurality of feedbacks may be adaptively changed according to a scene of the image. The processor 300 may change the priorities of the plurality of feedbacks on the basis of a parameter indicating the scene of the image among a plurality of parameters acquired through the analysis unit 310. For example, the processor 300 may increase a priority of the feedback "wide selfie recommend" in response to identification that the image is a scene including a face. The processor 300 may increase a priority of the feedback "panorama recommend" in response to identification that the image is a scene including a landscape. The processor 300 may increase a priority of the feedback "food recommend" in response to identification that the image is a scene including food.

According to various embodiments, the priorities of the plurality of feedbacks may be adaptively changed according to whether the image is an image acquired by a front camera or a rear camera. The processor 300 may identify whether the input image is acquired by a front camera or a rear camera on the basis of input metadata. For example, the processor 300 may increase the priority of the feedback "wide selfie recommend" in response to identification that the image is acquired by the front camera. The processor 300 may increase the priority of the feedback "panorama recommend" in response to identification that the image is acquired by the rear camera. However, the disclosure is not limited thereto.

Hereinafter, a first feedback of the plurality of feedbacks may be a feedback having a higher priority than a second feedback.

In operation 603, the processor 300 may identify whether a condition for providing the first feedback is satisfied according to priorities of the plurality of feedbacks. When it is identified that the condition for the first feedback is satisfied, the processor 300 may display a guidance corresponding to the first feedback in operation 604.

When it is identified that the condition for the first feedback is not satisfied, the processor 300 may identify whether a condition for providing the second feedback is satisfied in operation 605. When it is identified that the condition for the second feedback is satisfied, the processor 300 may display a guidance corresponding to the second feedback in operation 606.

Although not illustrated, when it is identified that the condition for the second feedback is not satisfied, the processor 300 may repeat the operation corresponding to operations 603 to 606 for feedbacks having lower priorities than the second feedback. [Table 3] below may show an example of a condition for providing each of the plurality of feedbacks.

TABLE 3

| Feedback | Timing | Condition | Guidance |
| --- | --- | --- | --- |
| Blurred face | Just after single image is captured | (1) identify that electronic device is not shaken (2) identify non-backlight (3) recognize that image includes face (4) identify that number of large faces is one or fewer based on assumption that recognized face area occupying predetermined ratio of entire area or more is large face (5) identify that number of blurred faces is one or more | First step: "Face was shaking. Capture again" Second step: "Face was shaking again. Capture again" |
| Closed eyes | Just after single image is captured | (1) recognize that image includes face (2) identify that face is not blurred (3) recognize that number of large faces of which area occupy predetermined ratio (n %) of entire image area or more is 1 (4) identify that face direction is within yaw n degrees and pitch n degrees from direction facing camera (5) identify that eye ratio is 25% or more in maximum open state and eye ratio in captured image is 50% of eye ratio of maximum eye open state or lower when horizontal to vertical ratio of recognized eye area is eye ratio | First step: "Your eyes were closed when the picture was taken. Capture again" Second step: "Your eyes are closed again. Capture again" |
| Device shake | Just after single image is captured | Determine that electronic device was shaking while capturing time point through gyro sensor (threshold for determining whether electronic device is shaken may be adaptively changed according to exposure time) | First step: "Picture is shaky. Capture again while holding the camera still" Second step: "Picture will look shaky if you move" Third step: "Capture while holding the camera still for a clear picture" |
| Tilt | Just after single image is captured | (1) non-selfie mode (2) recognize image for landscape based on scene analysis result (3) focal distance is within predetermined range (4) identify that vertical angle of electronic device is within predetermined range (for example, within 30 degrees) (5) identify that leftward tilt of electronic device is within predetermined range (for example, larger than or equal to 3 degrees and equal to or smaller than 25 degrees | First step (guide line is turned off): "Capture while turning on the vertical/horizontal guide line" (provide action object) Second step (guide line is turned on): Capture by leveling the electronic device while viewing the guide line" |
| Back-light | Just after preview aiming or just after single image is captured | Identify that preview image or captured image includes backlight | First step (HDR is turned off): "The subject is brighter in backlight if the HDR is turned on" (provide action object) Second step (HDR is turned on): "There is backlight. Touch the subject and control brightness" |

TABLE 3-continued

| Feedback | Timing | Condition | Guidance |
| --- | --- | --- | --- |
| Dirty lens | Just after entry into camera | Identify that lens is dirty based at least on image analysis | First step: "Clean the camera lens"<br>Second step: "Clean the camera lens for a clear picture" |
| Panorama recommend | Just after preview aiming or just after single image is captured | (1) recognize image for landscape based on scene analysis result (for example, identify that lower category is one of "open_country", "mountain", "coast", "cloud", and "sunset" based on scene analysis result)<br>(2) focal distance is within predetermined range<br>(3) identify that vertical angle of electronic device is within predetermined range (for example, within 30 degrees)<br>(4) identify that image for similar landscape is successfully captured for predetermined time | First step: "why don't you use panorama mode to capture the landscape" (provide action object)<br>Second step: Capture a great landscape image with panorama mode" (provide action object) |
| Food recommend | Just after preview aiming or just after single image is captured | (1) recognize image for food based on scene analysis result (for example, identify that lower category is "with_plate" based on scene analysis result<br>(2) focal distance is larger than predetermined range<br>(3) identify that angle of electronic device facing downwardly is larger than or equal to n degrees | First step: "why don't you use food mode to take a picture of more delicious-looking food" (provide action object)<br>Second step: "Use food mode to take a picture of more delicious-looking food" (provide action object) |
| Wide-selfie recommend | Just after preview aiming or just after single image is captured | (1) recognize that image includes face<br>(2) identify that number of large faces is predetermined number (for example, three) or more based on assumption that recognized face area occupying predetermined ratio of entire image area or more is large face<br>(3) identify that number of faces escaping area of predetermined range from center of image is one or more | First step: "why don't you use wide selfie suitable for taking a selfie with several people" (provide action object)<br>Second step: "You all can capture a group selfie in wide selfie mode" (provide action object) |
| Live focus recommend | Just after preview aiming or just after single image is captured | (1) recognize that image includes face<br>(2) identify that area of recognized face occupies area of predetermined ratio of entire image area or smaller (for example, larger than or equal to n % and equal to or smaller than m %)<br>(3) identify that number of recognized faces is predetermined number (for example, one)<br>(4) identify that surrounding luminance value is within predetermined range | First step: "capture a seamless picture in live focus mode" (provide action object) |
| Bixby vision recommend | Just after preview aiming or just after single image is captured | Identify that image includes text, QR code, or barcode (for example, identify that category is "document", "qr_code", or "barcode" based on scene analysis result) | In the case of text: "Recognize text in Bixby version" (provide action object)<br>In the case of QR code: "Recognize QR code in Bixby version" (provide action object)<br>In the case of barcode: "Recognize barcode in Bixby version" (provide action object) |
| Today's selfie recommend | Just after single image is captured | (1) recognize that image includes face<br>(2) identify that face area occupies predetermined ratio (n %) of entire image area or more | First step: "Would you like to capture today's selfie?" (provide action object) |
| Mode shortcut recommend | Just after preview aiming or just after single image is captured | (1) identify that number of times electronic device directly enters specific shooting mode without entering auto mode or selfie mode is larger than or equal to predetermined number after entering camera application<br>(2) generated when entering specific shooting mode next time | First step: "Would you like to add the mode shortcut to the home screen?" (provide action object) |
| Animated GIF recommend | Just after burst image is captured | Number of captured burst images is n or more | First step: "Would you link to make a moving GIF?" (provide action object) |

TABLE 3-continued

| Feedback | Timing | Condition | Guidance |
| --- | --- | --- | --- |
| Video summary recommend | Just after moving image is captured | (1) normal video recording is performed for n seconds or longer (2) summary can be extracted from captured moving image | First step: "Would you like to see video highlight?" (provide action object) |

[Table 3] may show an example of the condition for each feedback. A first column in [Table 3] may indicate a plurality of feedbacks which can be provided. A second column may indicate a time point at which each feedback is provided. Among the time points at which the feedbacks are provided, preview aiming may indicate that the posture of the electronic device 101 is maintained for a predetermined time in a preview state. A third column may indicate a condition for each feedback. A fourth column may indicate a guidance corresponding to each feedback. [Table 3] is only an example, and the disclosure is not limited thereto.

In [Table 3], a today's selfie mode may be a mode for recommending a function specialized at selfie everyday (for example, AR sticker, stamp, filter, play selfie, and the like).

In [Table 3], a mode shortcut function may be a function for generating a shortcut icon of a shooting mode, which is frequently used, on a home screen.

In [Table 3], an action object may be an object for applying (or executing) a function recommended by the guidance. For example, the processor 300 may (seamlessly) apply or execute the function recommended by the guidance in response to reception of a user input (for example, a touch) for the action object.

According to various embodiments, the plurality of feedbacks may be divided into a feedback provided whenever the feedback is detected and a feedback of which a provision frequency is controlled according to the use thereof. For example, the feedback for "blurred face" and the feedback for "closed eyes" may be provided whenever the feedbacks are detected. The provision frequency of the feedback for "device shake", "tilt", "backlight", or "dirty lens" may be controlled according to the use thereof. However, the disclosure is not limited thereto. According to an embodiment, the user may separately configure the feedback provided whenever the feedback is detected and the feedback of which the provision frequency is controlled.

Figure 7:
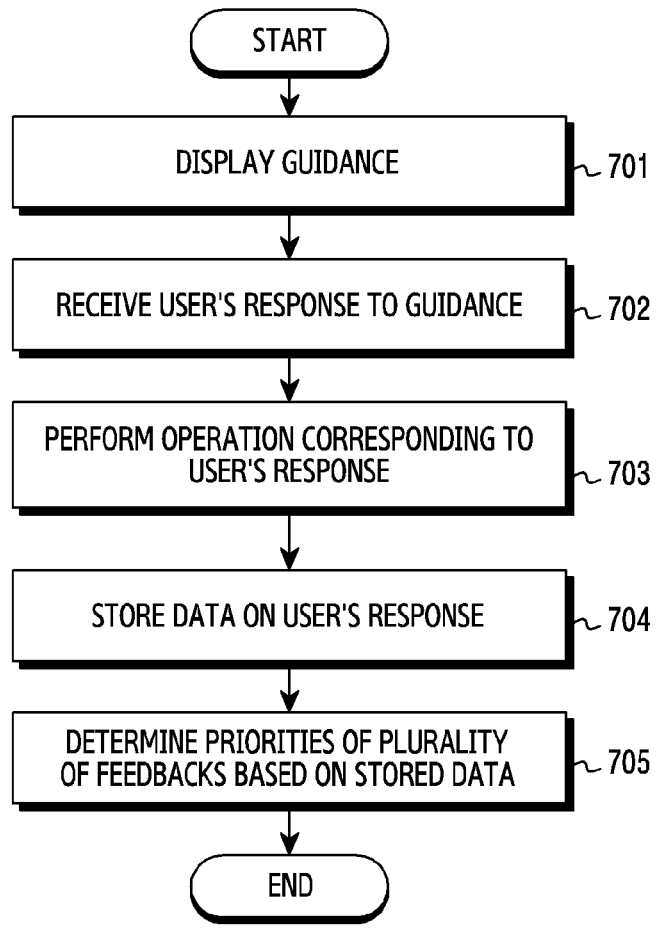
FIG. 7 illustrates an example of the operation in which the electronic device receives a user response to a guidance according to various embodiments.

FIG. 7 illustrates an example of the operation in which the electronic device 101 receives a user's response to a guidance according to various embodiments. The operations illustrated in FIG. 7 may be performed by the processor 300 (that is, at least one of the processor 120 or the image signal processor 260). The operations illustrated in FIG. 7 may be performed subsequently to operation 504 of FIG. 5. The operations illustrated in FIG. 7 may be performed subsequently to operation 604 or 606 of FIG. 6.

Referring to FIG. 7, in operation 701, the processor 300 may display a guidance corresponding to a feedback to be provided to the user. Operation 701 may correspond to operation 504 of FIG. 5. The guidance may be displayed in the form of a popup or a notification within a screen of a camera application. The guidance may be floated on the screen of the camera application.

According to an embodiment, a guidance recommending a function related to capturing (that is, the guidance corresponding to the second type feedback) may include an object for applying (or executing) a function recommended by the guidance. For example, a guidance corresponding to the feedback "panorama recommend" may include a button or an icon for applying a panorama mode. The processor 300 may display together the guidance recommending the function related to capturing and the object (hereinafter, referred to as an action object) for applying (or executing) the function. According to some embodiments, a guidance inducing recapturing (that is, the guidance corresponding to the first type feedback) may not include the action object. However, the disclosure is not limited thereto.

In operation 702, the processor 300 may receive a user's response to the guidance. The user's response to the guidance may include a positive response and a negative response. The positive response may be a user input for the action object for applying the function recommended by the guidance. For example, the positive response may be a touch input for the button or the icon for applying the function recommended by the guidance. The negative response may be a user input for removing the guidance. The user input for removing the guidance may include a tap input in an area other than the guidance.

In operation 703, the processor 300 may perform an operation corresponding to the user's response. According to various embodiment, the processor 300 may (seamlessly) apply or execute the function recommended by the guidance in response to reception of a user input (for example, a positive response) for the action object included in the guidance. In response to the application or the execution, the processor 300 may display an image to which the function is applied through the camera application. For example, the processor 300 may display a preview image to which the function is applied or display an image obtained by applying the function to the captured image as the result. Accordingly, the user may be recommended an optimal function according to a capturing condition and directly apply the recommended function.

According to various embodiments, the processor 300 may remove displaying of the guidance in response to reception of a user input (that is, a negative response) for removing the guidance. For example, the processor 300 may remove displaying of the guidance in response to reception of a tap input in an area other than the guidance.

According to various embodiments, the processor 300 may receive no user input while the guidance is displayed. The processor 300 may remove displaying of the guidance in response to non-reception of a user input (that is, a negative response) related to the guidance for a predetermined time.

In operation 704, the processor 300 may store data on the user's response in the memory (for example, the memory 130 or the memory 250). The processor 300 may store the feedback provided by the electronic device 101 and the user's response thereto such that they are associated with each other. For example, the processor 300 may record (or log) the user's positive response and negative response for the plurality of feedbacks.

In operation 705, the processor 300 may determine priorities of the plurality of feedbacks on the basis of the stored data. For example, the processor may adaptively change the priorities of the plurality of feedbacks on the basis of data on the user's response. For example, when a positive response is frequently received for a specific feedback, the processor 300 may increase the priority of the feedback. When a negative response is frequently received for a specific feedback, the processor 300 may decrease the priority of the feedback. Changed priorities may be used when the processor 300 (for example, the determination unit 320) determines a plurality of feedbacks which can be provided to the user and/or determine priorities of the plurality of feedbacks in operation 602 of FIG. 6.

When a negative response is received from a specific feedback, the processor 300 may not detect nor provide the feedback for a predetermined time.

Figure 8:
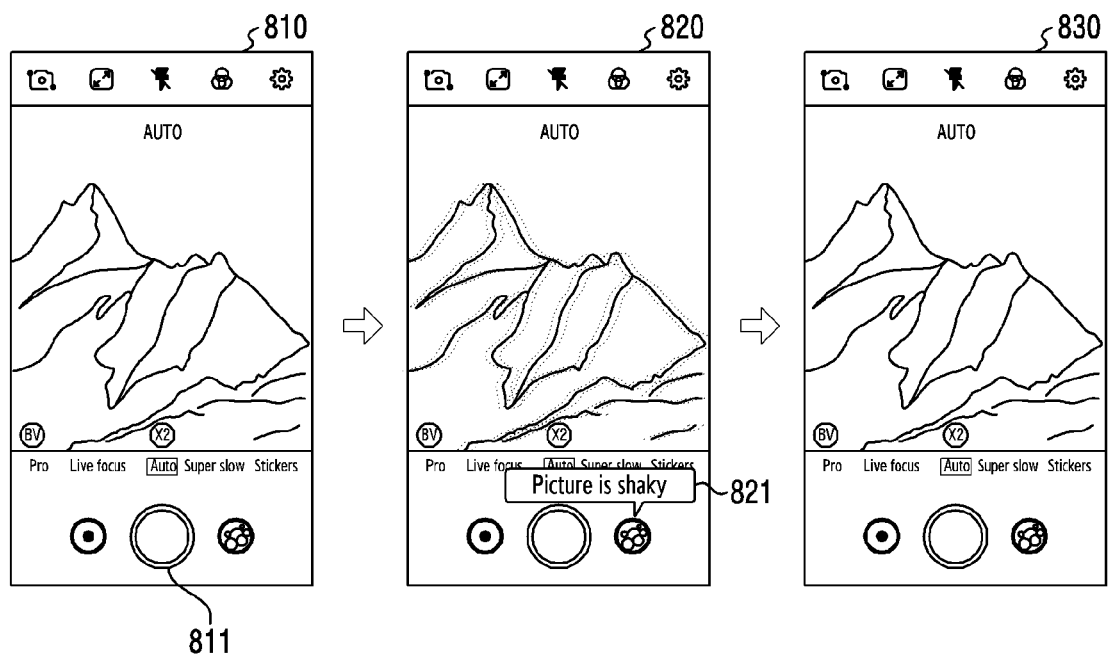
FIG. 8 illustrates an example of a screen for providing a feedback inducing recapturing by the electronic device according to various embodiments.

FIG. 8 illustrates an example of a screen for providing a feedback inducing recapturing by the electronic device 101 according to various embodiments.

Referring to FIG. 8, the electronic device 101 may enter the camera application and display a screen 810 through a display (for example, the display device 160). The screen 810 may be a preview image. The electronic device 101 may capture an image in response to reception of an input (for example, a touch) for a button 811 for capturing the image. The electronic device 101 may perform the operations illustrated in FIG. 5 or 6 through the captured image in response to capturing of the image. The electronic device 101 may identify that the feedback for "device shake" is a feedback to be provided to the user according to priorities of the plurality of feedbacks which can be provided. The electronic device 101 may display a screen 820 on the basis of the identification. For example, the electronic device 101 may display the screen 820 in response to capturing of the image. The screen 820 may include a guidance 821 corresponding to the feedback for "device shake". According to an embodiment, the feedback for "device shake" is a feedback inducing recapturing and may not include an action object. When a predetermined time passes from a time point at which the guidance 821 is displayed, the electronic device 101 may display a screen 830 from which the guidance 821 is removed. Alternatively, the electronic device 101 may display the screen 830 from which the guidance 821 is removed in response to reception of a tap input in an area other than the guidance 821.

However, the disclosure is not limited thereto, and the guidance 821 may include an action object button according to another embodiment. The electronic device 101 may display the preview image on the screen 810 again for recapturing in response to reception of a user input for the action object included in the guidance 821.

Figure 9:
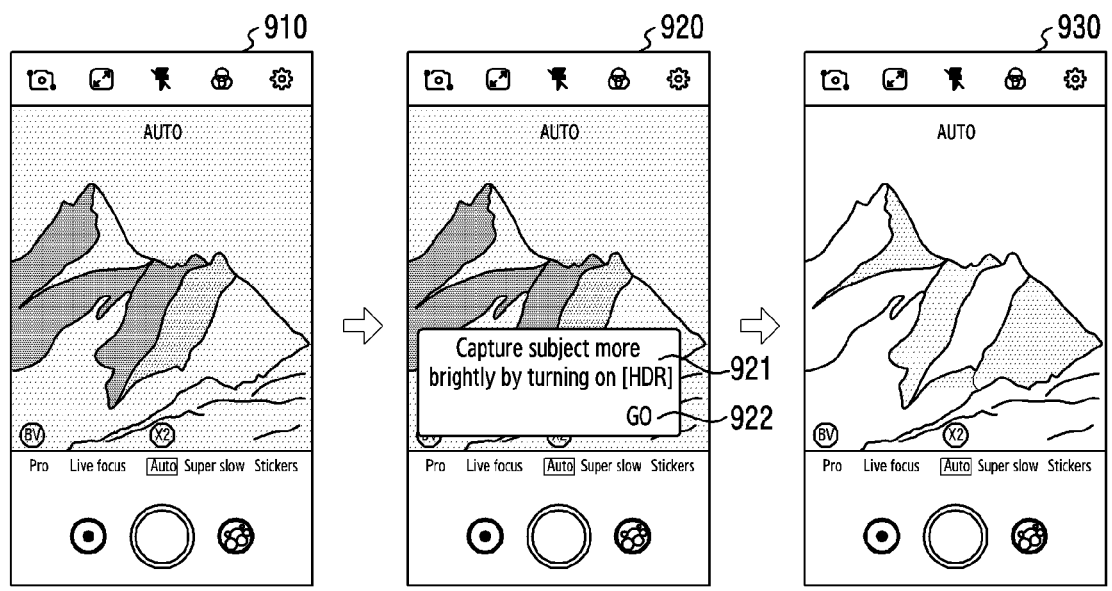
FIG. 9 illustrates an example of a screen for providing a feedback recommending a function related to capturing by the electronic device according to various embodiments.

FIG. 9 illustrates an example of a screen for providing a feedback recommending a function related to capturing by the electronic device 101 according to various embodiments.

Referring to FIG. 9, the electronic device 101 may display a screen 910 through a camera application.

According to an embodiment, the screen 910 may be a preview screen. A preview image on the screen 910 may include backlight. The electronic device 101 may perform the operations illustrated in FIG. 5 or 6 on the basis of a plurality of images acquired in a preview state. The electronic device 101 may identify that the feedback for "backlight" is a feedback to be provided to the user according to priorities of the plurality of feedbacks which can be provided. For example, the electronic device 101 may identify the feedback in response to identification that posture of the electronic device 101 is maintained for a predetermined time in a preview state. The electronic device 101 may display a screen 920 on the basis of the identification. The screen 920 may display a guidance 921 corresponding to the feedback for "backlight". According to an embodiment, the feedback for "backlight" may include an action object 922. The electronic device 101 may display a preview image on the screen 930 to which an HDR is applied in response to reception of a user input for the action object 922 included in the guidance 921. When a predetermined time passes from a time point at which the guidance 921 is displayed without any user input, the electronic device 101 may remove the guidance 921. Alternatively, the electronic device 101 may remove the guidance 921 in response to reception of a tap input in an area other than the guidance 921.

According to another embodiment, the screen 910 may be a screen just after a single image is captured. The captured image on the screen 910 may include backlight. The electronic device 101 may perform the operations illustrated in FIG. 4 or 6 on the basis of the captured image. The electronic device 101 may identify that the captured image requires a feedback for "backlight" according to priorities of a plurality of feedbacks which can be provided. The electronic device 101 may display a screen 920 on the basis of the identification. For example, the electronic device 101 may display the screen 920 including the guidance 921 in response to capturing of the image in the state in which the screen 910 is displayed. The electronic device 101 may display the screen 930 in response to reception of a user input for the action object 922. For example, the screen 930 may be a preview screen to which an HDR is applied. In another example, the screen 930 may be a resultant image obtained by correcting brightness in the captured image.

Figure 10:
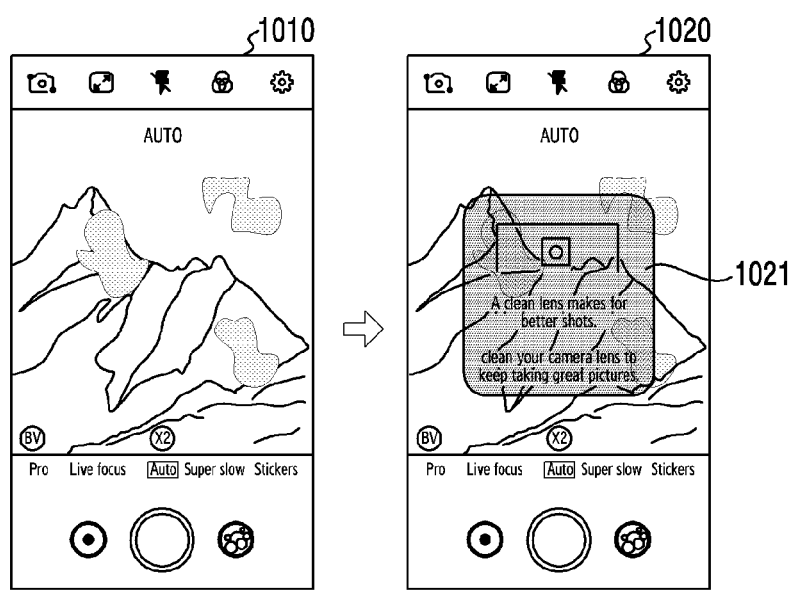
FIG. 10 illustrates an example of a screen for providing another feedback inducing recapturing by the electronic device according to various embodiments.

FIG. 10 illustrates an example of a screen for providing another feedback inducing recapturing by the electronic device 101 according to various embodiments.

Referring to FIG. 10, the electronic device 101 may display a screen 1010 (that is, a preview screen) in response to entry into a camera application. The electronic device 101 may identify whether a lens is dirty on the basis of a plurality of images acquired in a preview state in response to entry into the camera application. The electronic device 101 may identify that the lens is dirty after a predetermined time (for example, 10 seconds) passes from the time point of the entry into the camera application. Accordingly, the electronic device 101 may display a guidance 1021 corresponding to the feedback for "dirty lens" (a screen 1020) after a predetermined time passes from a time point at which the screen 1010 is displayed. The screen 1020 may be a screen obtained by floating the guidance 1021 on the screen 1010.

When a predetermined time passes from a time point at which the guidance 1021 is displayed, the electronic device 101 may display the screen 1010 from which the guidance 1021 is removed again. Alternatively, the electronic device 101 may display the screen 1010 from which the guidance 1021 is removed in response to reception of a tap input in an area other than the guidance 1021.

The electronic device 101 may limit displaying of the guidance 1021 for a predetermined time (for example, 24 hours) from a time point at which the guidance 1021 corresponding "dirty lens" is displayed. For example, the electronic device 101 may not identify whether the lens is dirty from an image acquired through a camera (for example, the camera module 180) for a predetermined time from the time point at which the guidance 1021 is displayed.

When a predetermined time (for example, 24 hours) passes from the time point at which the guidance 1021 is displayed, the electronic device 101 may identify again whether the lens is dirty.

The user may configure whether to receive the feedback for "dirty lens" through the electronic device 101. For example, when the user does not want to receive the feedback for "dirty lens", the user may configure it through the electronic device 101. To this end, the electronic device 101 may provide a user interface (for example, a configuration menu) for configuring whether to provide the feedback for "dirty lens". This is not limited only to the feedback for "dirty lens", and the electronic device 101 may configure whether to provide a feedback for each of the plurality of feedbacks.

Figure 11:
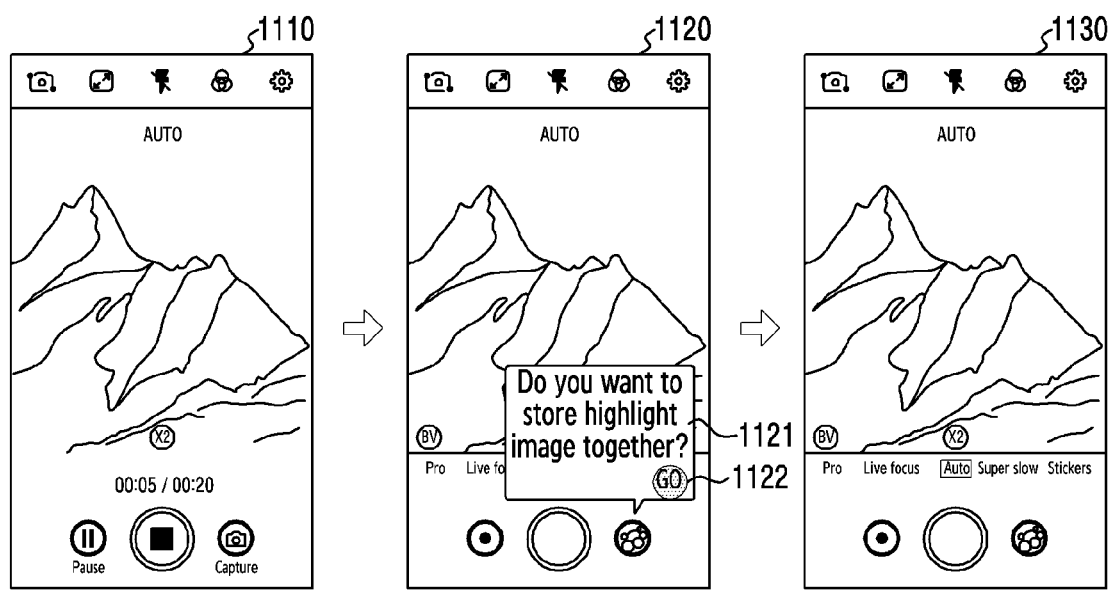
FIG. 11 illustrates an example of a screen for providing another feedback recommending a function related to capturing by the electronic device according to various embodiments.

FIG. 11 illustrates an example of a screen for providing another feedback recommending a function related to capturing by the electronic device 101 according to various embodiments.

Referring to FIG. 11, a screen 1110 may be a screen obtained by capturing a moving image. The electronic device 101 may display the screen 1110 while the moving image is captured. The electronic device 101 may perform the operations of FIG. 5 or 6 for captured moving images in response to completion of capturing of the moving image (for example, in response to an input for a stop button). The electronic device 101 may identify that the feedback "video summary recommend" is required according to priorities of a plurality of feedbacks for the moving image. The electronic device 101 may display a guidance 1121 within a screen 1120 on the basis of the identification. The guidance 1121 may include an action object 1122 for applying (or executing) a function recommended by the guidance 1121. The electronic device 101 may perform a function corresponding to the guidance 1121 on the basis of reception of an input for the action object 1122. For example, the electronic device 101 may store a highlight image of the moving image along with the captured moving image in response to reception of the input for the action object 1122. The highlight image may be identified on the basis of, for example, scene analysis for the moving image. For example, the electronic device 101 may identify the highlight image such that the moving image includes frames including a voice signal at a predetermined level or higher. The electronic device 101 may display a preview screen 1130 to identify the highlight image such that the moving image includes frames having a inter-frame image change at a predetermined level or higher.

Figure 12:
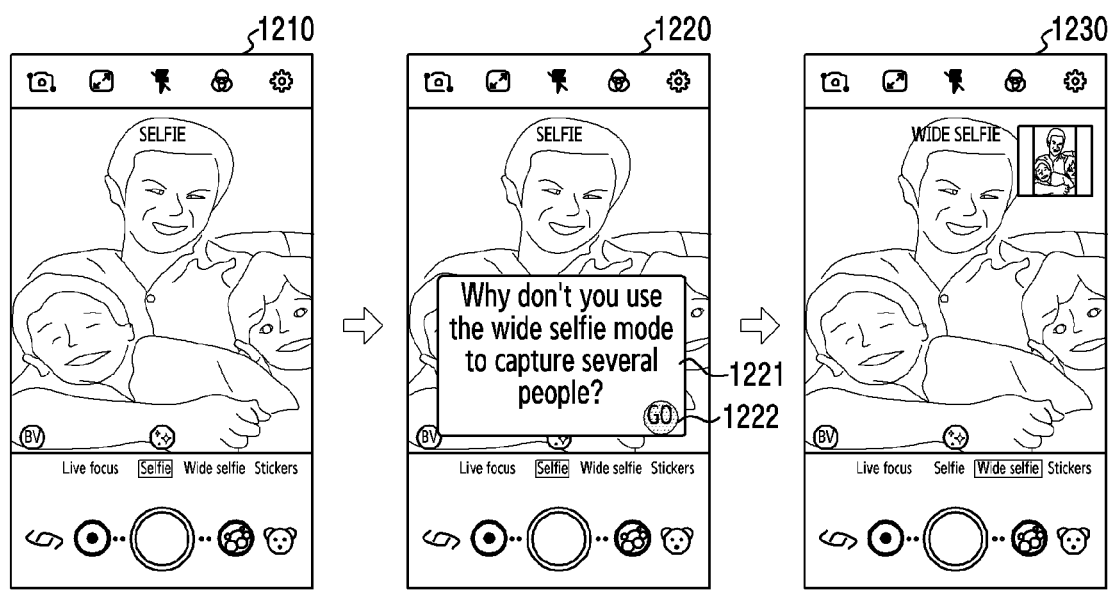
FIG. 12 illustrates an example of a screen for providing another feedback recommending a function related to capturing by the electronic device according to various embodiments.

FIG. 12 illustrates an example of a screen for providing another feedback recommending a function related to capturing by the electronic device 101 according to various embodiments.

Referring to FIG. 12, a screen 1210 may be a preview screen or a captured image. The electronic device 101 may perform the operations of FIG. 5 or 6 for the image in response to acquisition of the image on the screen 1210. For example, the electronic device 101 may identify that the image is a scene including a face on the basis of scene analysis. The electronic device 101 may identify that the feedback "wide selfie recommend" is required according to priorities of a plurality of adaptively determined feedbacks. The electronic device 101 may display a guidance 1221 within a screen 1220 on the basis of the identification. The guidance 1221 may include an action object 1222. The electronic device 101 may perform a function corresponding to the guidance 1221 on the basis of reception of an input for the action object 1222. For example, the electronic device 101 may display a preview screen 1230 to which the wide selfie mode is applied in response to reception of an input for the action object 1222.

Figure 13:
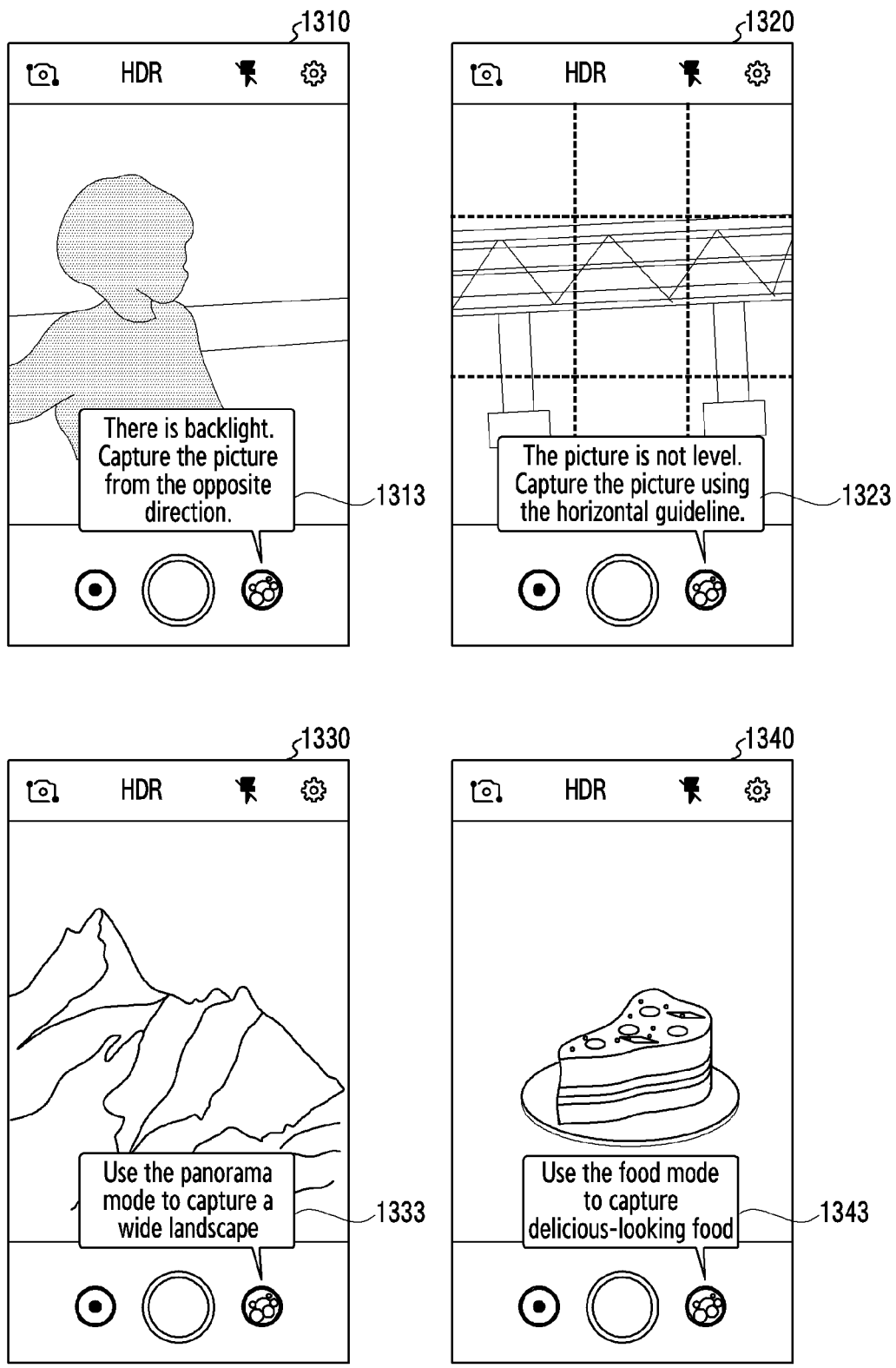
FIG. 13 illustrates an example of a screen for providing various feedbacks by the electronic device according to various embodiments.

FIG. 13 illustrates an example of a screen for providing various feedbacks by the electronic device 101 according to various embodiments.

Referring to FIG. 13, the electronic device 101 may display a screen 1310 including a guidance 1313 configured as text indicating that a current capturing condition is a backlight state in response to identification that the feedback for "backlight" is required according to the priority. The electronic device 101 may display a screen 1320 including a guidance 1323 configured as text indicating that current posture of the electronic device 101 is not horizontal in response to identification that the feedback for "tilt" is required according to the priority. The electronic device 101 may display a screen 1330 including a guidance 1333 configured as text indicating that a scene of the image is suitable for a panorama mode in response to identification that the feedback for "panorama recommend" is required according to the priority. The electronic device 101 may display a screen 1340 including a guidance 1343 configured as text indicating that a scene of the image is suitable for a food mode in response to identification that the feedback for "food recommend" is required according to the priority.

Figure 14:
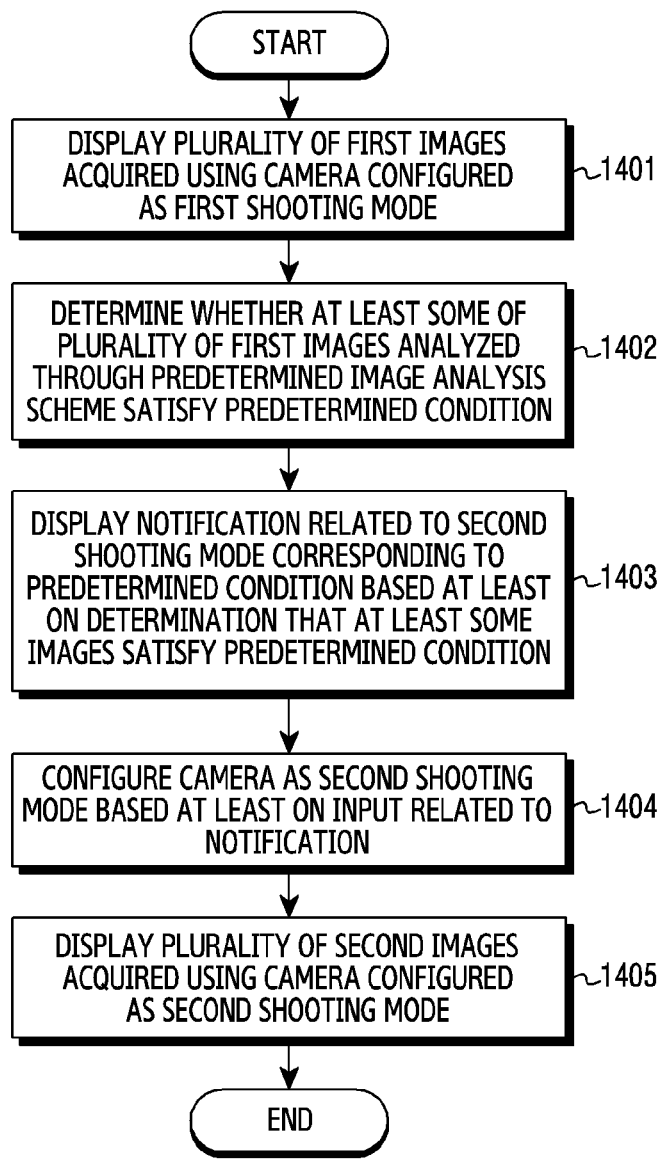
FIG. 14 illustrates an example of the operation for changing a shooting mode of the camera on the basis of a notification while the electronic device displays a plurality of images according to various embodiments.

FIG. 14 illustrates an example of the operation for changing a shooting mode of a camera on the basis of a notification while the electronic device 101 displays a plurality of images according to various embodiments. The operations illustrated in FIG. 14 may be performed by the processor 300 (that is, at least one of the processor 120 or the image signal processor 260).

Referring to FIG. 14, in operation 1401, the processor 300 may display, through a display (for example, the display device 160), a plurality of first images of an external object acquired using a camera (for example, the camera module 180) configured in a first shooting mode. The first shooting mode may be, for example, a shooting mode configured to be automatically applied in response to entry into a camera application. The first shooting mode may include one of an auto mode or a selfie mode. The plurality of first images may be a plurality of images acquired as previews.

In operation 1402, the processor 300 may determine whether at least some of the plurality of first images analyzed through a predetermined image analysis scheme satisfy a predetermined condition while the plurality of first images are displayed.

The predetermined image analysis scheme may be a scheme for identifying a feedback to be provided to the user according to priorities of a plurality of feedbacks. The predetermined image analysis scheme may be an analysis scheme according to the priority corresponding to a preview image. The predetermined image analysis scheme may include at least a portion of scene analysis.

The operation for determining whether at least some of the plurality of first images satisfy the predetermined condition may be an operation for determining whether a feedback recommending a specific shooting mode is required. For example, the predetermined condition may correspond to the condition in [Table 3].

For example, the processor 300 may determine whether at least some of the plurality of first images correspond to a scene including food according to the priority. Alternatively, the processor 300 may determine whether at least some of the plurality of first images correspond to a scene including landscape according to the priority. The aforementioned determination operation may be based on at least a portion of scene analysis.

In operation 1403, the processor 300 may display a notification related to a second shooting mode corresponding to the predetermined condition through the display at least one the basis of determination that at least some of the images satisfy the predetermined condition.

For example, the processor 300 may determine that the feedback "food recommend" is required according to priorities of the plurality of feedbacks at least on the basis of determination that at least some of the plurality of first images correspond to the scene including food. The processor 300 may display a notification related to "food recommend" on the basis of determination that the feedback "food recommend" is required. In this case, in operation 1403, the second shooting mode may be a food mode. The notification related to the second shooting mode may be a guidance corresponding to the feedback "food recommend".

In operation 1404, the processor 300 may configure the camera as the second shooting mode at least one the basis of an input related to a notification. The input related to the notification may be a user input for applying a function recommended by the notification (or the guidance). For example, the input related to the notification may include a user input for the action object included in the notification (or the guidance).

For example, the processor 300 may configure the camera as the food mode at least on the basis of a user input for the action object included in the guidance corresponding to the feedback "food recommend".

In operation 1405, the processor 300 may display, through the display, a plurality of second images for the external object acquired using the camera configured as the second shooting mode. The plurality of second images may be preview images displayed on the display in the state configured as the second shooting mode.

For example, the processor 300 may display the plurality of second images acquired in the state configured as the food mode through the display.

Operations illustrated in FIG. 14 may correspond to the operation for providing the feedback recommending the function related to capturing on the basis of a predetermined image analysis scheme in a preview state.

Figure 15:
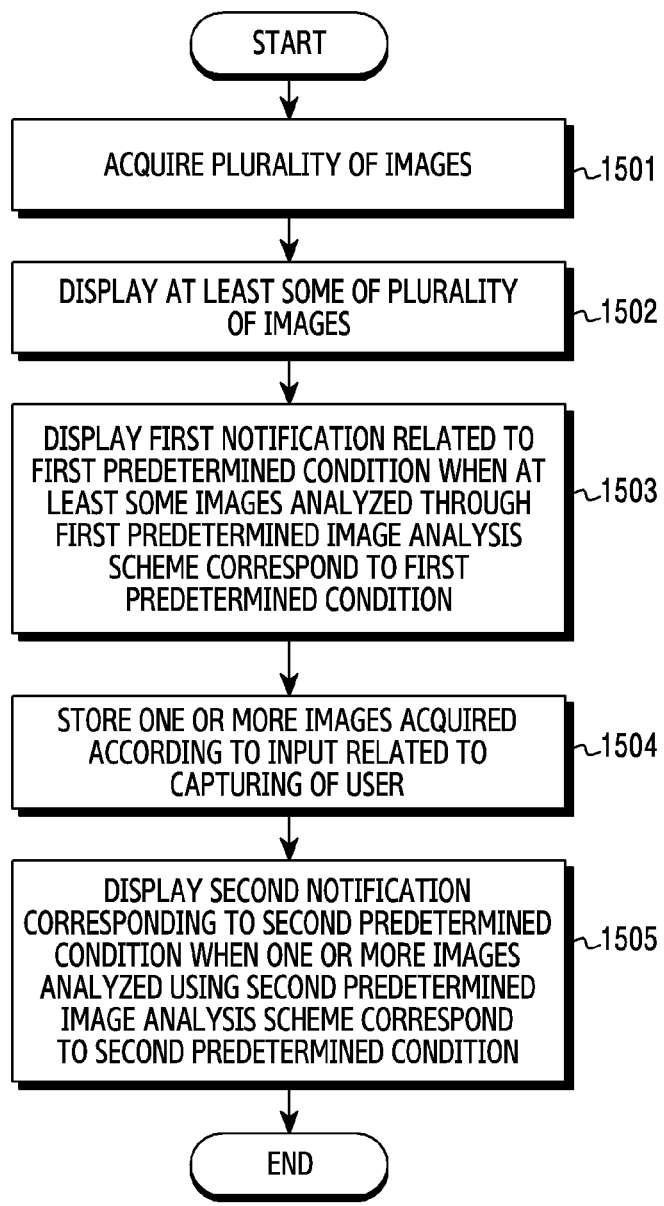
FIG. 15 illustrates an example of the operation in which the electronic device provides a notification for an image analyzed according to a priority according to various embodiments.

FIG. 15 illustrates an example of the operation in which the electronic device 101 provides a notification of an analyzed image on the basis of the priority according to various embodiments. The operations illustrated in FIG. 15 may be performed by the processor 300 (that is, at least one of the processor 120 or the image signal processor 260).

Referring to FIG. 15, in operation 1501, the processor 300 may acquire a plurality of images for an external object through a camera (for example, the camera module 180). The plurality of images may be a plurality of images acquired in a preview state.

In operation 1502, the processor 300 may display at least some of the plurality of images through the display during at least a portion of the time during which the plurality of images are acquired.

When at least some of the images analyzed through a first predetermined image analysis scheme correspond to a first predetermined condition while at least some of the images are displayed, the processor 300 may display a first notification related to the first predetermined condition through the display in operation 1503.

The first predetermined image analysis scheme may be an image analysis scheme for a preview image. For example, the first image analysis scheme may be an image analysis scheme for identifying a feedback to be provided to the user according to a priority corresponding to the preview image. For example, since the feedback for "blurred face" or "closed eyes" may not be required in the preview state, the first image analysis scheme may include an analysis scheme other than the analysis scheme for "blurred face" or "closed eyes".

The first predetermined condition may be a condition for providing a specific feedback according to the priority corresponding to the preview image. For example, the first predetermined condition may correspond to the condition in [Table 3]. The first notification related to the first predetermined condition may be a guidance corresponding to the specific feedback. That is, when at least some images satisfy the first predetermined condition for providing the specific feedback, the processor 300 may display a guidance (or the first notification) corresponding to the specific feedback.

In operation 1504, the processor 300 may store one or more images acquired according to an input related to capturing of the user among the plurality of images in the memory (for example, the memory 130 or the memory 250) while at least some images are displayed. The input related to capturing of the user may include, for example, an input (for example, a touch) for a capturing button. In the case of capturing a moving image, the input related to capturing of the user may include an input (for example, an input for a stop button) for completing capturing. One or more images acquired according to the input related to capturing of the user may include a single image, a burst image, or a moving image.

When one or more images analyzed through a second predetermined image analysis scheme correspond to a second predetermined condition, the processor 300 may display a second notification corresponding to the second predetermined condition through the display in operation 1505.

The second predetermined image analysis scheme may be an image analysis scheme for captured images (for example, the one or more images). For example, when the captured image is a single image, the second predetermined image analysis scheme may be an analysis scheme according to a priority corresponding to the single image. When the captured image is a burst image, the second predetermined image analysis scheme may be an analysis scheme according to a priority corresponding to the burst image. When the captured image is a moving image, the second predetermined image analysis scheme may be an analysis scheme according to a priority corresponding to the moving image. The second predetermined image analysis scheme may be different from the first predetermined image analysis scheme.

The second predetermined condition may be a condition for providing a specific feedback according to a priority corresponding to the captured image. The second notification corresponding to the second predetermined condition may be a guidance corresponding to the specific feedback. That is, when the one or more images satisfy the second predetermined condition for providing the specific feedback, the processor 300 may display the guidance (or the second notification) corresponding to the specific feedback.

The operations illustrated in FIG. 15 may correspond to the operation for displaying the first notification when preview images satisfy the first predetermined condition in a preview state and then displaying the second notification when one or more captured images satisfy the second predetermined condition.

As described in the above, an electronic device (e.g., the electronic device 101) according to various embodiments may include: at least one camera (e.g., the camera module 180); at least one memory (e.g., the memory 130) configured to store instructions; a display (e.g., the display device 160); and at least one processor (e.g., the processor 120, the image signal processor 260, and/or the processor 300), and the at least one processor is, when the instructions are executed, configured to: acquire an image through the at least one camera, acquire a plurality of parameters related to acquisition of the image, identify a feedback to be provided to a user according to priorities of a plurality of feedbacks among the plurality of feedbacks, which can be provided to the user, based on at least some of the plurality of acquired parameters, and display a guidance corresponding to the identified feedback through the display.

According to various embodiments, the at least one processor may be further configured to, when the instructions are executed, determine the priorities of the plurality of feedbacks based on a type of the acquired image.

According to various embodiments, the guidance may be displayed for recommending the function related to capturing and include the object for executing the function related to capturing.

According to various embodiments, the at least one processor may be further configured to, when the instructions are executed, receive a user response to the guidance and perform a predetermined operation corresponding to the user response in response to the reception.

According to various embodiments, the at least one processor may be further configured to, when the instructions are executed, store the identified feedback and data on the user response for the guidance such that they are associated with each other and determine the priorities of the plurality of feedbacks based on the stored data.

According to various embodiments, the user response to the guidance may include at least one of a first user response for applying a function recommended by the guidance and a second user response for ignoring the guidance.

According to various embodiments, the at least one processor may be configured to, when the instructions are executed, determine the priorities by increasing a priority of the identified feedback based at least on reception of the first user response to the guidance and decreasing a priority of the identified feedback based on reception of the second user response to the guidance.

According to various embodiments, the at least one processor may be configured to, when the instructions are executed, display an image, acquired through the at least one camera, to which the function recommended by the guidance is applied, in response to reception of the first user response to the guidance.

According to various embodiments, the at least one processor may be further configured to, when the instructions are executed, limit identification of the feedback during a predetermined time from a time point at which the second user response to the guidance is received.

According to various embodiments, the image acquired through the at least one camera may be a preview image and may include at least one of a plurality of images, a captured single image, a captured burst image, or a captured moving image.

According to various embodiments, the plurality of feedbacks which can be provided to the user may include at least one of a feedback inducing recapturing or a feedback recommending a function related to capturing.

According to various embodiments, a priority of the feedback inducing the recapturing may be higher than a priority of the feedback recommending the function related to the capturing.

According to various embodiments, the plurality of parameters may include at least one of a parameter for a degree of backlight of the image, a parameter for identifying whether a lens of the at least one camera is dirty, a parameter for luminance of the image, a parameter for a scene of the image, a parameter for a degree of blur of the image, a parameter for a horizontal level of the electronic device, a parameter for a degree of shaking of the electronic device, a parameter for a degree of blur of a face included in the image, or a parameter for a degree of closed eyes of a person included in the image.

As described in the above, an electronic device (e.g., the electronic device 101) according to various embodiments may include: a camera (e.g., the camera module 180), a memory (e.g., the memory 130) configured to store instructions; a display (e.g., the display device 160); and a processor (e.g., the processor 120, the image signal processor 260, and/or the processor 300), and the processor is configured to: display a plurality of first images of an external object acquired through the camera configured as a first shooting mode through the display, determine whether at least some of the plurality of first images analyzed through a predetermined image analysis scheme satisfy a predetermined condition while the plurality of first images are displayed, display a notification (e.g., the guidance) related to a second shooting mode corresponding to the predetermined condition through the display based at least on determination that the at least some images satisfy the predetermined condition, configure the camera as the second shooting mode based at least one an input related to the notification, and display a plurality of second images of the external object acquired using the camera configured as the second shooting mode through the display.

According to various embodiments, the processor may be configured to determine whether the predetermined condition is satisfied further based on the first shooting mode.

According to various embodiments, the processor may be configured to determine whether at least some of the plurality of first images satisfy another predetermined condition and provide a shooting guide according to the first shooting mode based on determination that the at least some of the plurality of first images satisfy the another predetermined condition.

According to various embodiments, the processor may be configured to provide the shooting guide based on a parameter (e.g., the plurality of parameter, the plurality of feedbacks, and/or the priority of the plurality of the feedbacks) related to provision of the guide and control the parameter related to provision of the guide based on a received user input in connection with the shooting guide.

As described in the above, an electronic device (e.g., the electronic device 101) according to various embodiments may include: a camera (e.g., the camera module 180); a display (e.g., the display device 160); a memory (e.g., the memory 130); and a processor (e.g., the processor 120, the image signal processor 260, and/or the processor 300), and the processor is configured to: acquire a plurality of images of an external object through the camera, display at least some of the plurality of images through the display for at least a portion of a time during which the plurality of images are acquired, display a first notification related to a first predetermined condition through the display when the at least some images analyzed through a first predetermined image analysis scheme correspond to the first predetermined condition while the at least some images are displayed, store one or more images acquired according to an input related to capturing of a user among the plurality of images in the memory while the at least some images are displayed, and display a second notification corresponding to a second predetermined condition through the display when the one or more images analyzed using a second predetermined image analysis scheme correspond to the second predetermined condition.

According to various embodiments, the processor may be configured to generate a moving image of a plurality of images corresponding to at least some of the plurality of images based on reception of an input related to capturing of the moving image by the camera, determine whether the plurality of images corresponding to the at least some images satisfy a third predetermined condition through a third predetermined image analysis scheme, and provide a third notification corresponding to the third predetermined condition based on determination that the plurality of images corresponding to the at least some images satisfy the third predetermined condition.

According to various embodiments, the processor may be configured to acquire condition information (e.g., the plurality of parameter, the plurality of feedbacks, and/or the priority of the plurality of the feedbacks) of the electronic device based on the storing of the one or more images and determine whether the one or more images satisfy the second predetermined condition further based on the condition information.

An apparatus and a method according to various embodiments may provide an optimal feedback to the user according to a condition under which an image is captured.

Effects which can be acquired by the disclosure are not limited to the above described effects, and other effects that have not been mentioned may be clearly understood by those skilled in the art from the following description.

Meanwhile, although the concrete embodiments of the disclosure have been described in the detailed description of the disclosure, various modifications can be made without departing from the scope of the disclosure. Therefore, the scope of the disclosure should not be limited to the aforementioned embodiments, but should be defined by the equivalents to the appended claims as well as the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   at least one camera;
   at least one memory configured to store instructions;
   a display; and
   at least one processor,
   wherein the at least one processor is configured to:
   acquire an image through the at least one camera,
   acquire a plurality of parameters related to acquiring the image,
   identify a feedback of a plurality of feedbacks to be provided to a user according to priorities associated with the plurality of feedbacks, based on a portion of the plurality of parameters, and
   display a guidance corresponding to the identified feedback through the display,
   wherein the guidance includes an object related to activation of a function associated with capturing by the camera,
   activate the function associated with the capturing based on reception of an input related to the guidance.

2. The electronic device of claim 1, wherein the at least one processor is further configured to:
   receive a user response for the guidance, and
   in response to receiving the user response, perform a predetermined operation corresponding to the user response.

3. The electronic device of claim 2, wherein the at least one processor is further configured to:
   store the identified feedback and data on the user response for the guidance, wherein the identified feedback and the data are associated with each other, and
   determine the priorities of the plurality of feedbacks based on the stored data.

4. The electronic device of claim 3, wherein:
   the user response for the guidance includes at least one of:
      a first user response for applying a function recommended by the guidance, and
      a second user response for ignoring the guidance, and
   wherein the at least one processor is configured to determine the priorities based on the first user response or the second user response.

5. The electronic device of claim 4, wherein to determine the priorities the at least one processor is configured to:
   increase a priority of the identified feedback based on receiving the first user response for the guidance, and
   decrease the priority of the identified feedback based on receiving the second user response for the guidance.

6. The electronic device of claim 4, wherein the at least one processor is further configured to:
   in response to receiving of the first user response to the guidance, apply the function recommended by the guidance; and
   after applying the function recommended by the guidance, display the image, acquired through the at least one camera.

7. The electronic device of claim 4, wherein the at least one processor is further configured to:
   limit identification of the feedback during a predetermined time from a time point at which the second user response for the guidance is received.

8. The electronic device of claim 1, wherein the image acquired through the at least one camera is a preview image and includes at least one of:
   a plurality of images,
   a captured single image,
   a captured burst image, or
   a captured moving image.

9. The electronic device of claim 1, wherein the plurality of feedbacks that are provided to the user include at least one of:
   a feedback inducing recapturing, or
   a feedback recommending a function related to capturing.

10. The electronic device of claim 9, wherein a priority of the feedback inducing the recapturing is higher than the priority of the feedback recommending the function related to the capturing.

11. The electronic device of claim 1, wherein the plurality of parameters include at least one of:
   a parameter for a degree of backlight of the image,
   a parameter for identifying whether a lens of the at least one camera is dirty,
   a parameter for luminance of the image,
   a parameter for a scene of the image,
   a parameter for a degree of blur of the image,
   a parameter for a horizontal level of the electronic device,
   a parameter for a degree of shaking of the electronic device,
   a parameter for a degree of blur of a face included in the image, or
   a parameter for a degree of closed eyes of a person included in the image.

* * * * *